Sept. 24, 1946.　　W. K. ANDREW ET AL　　2,407,970
WORK INDEXING MECHANISM
Filed April 13, 1942　　7 Sheets-Sheet 1

INVENTORS:
WILLIAM K. ANDREW
& JOSEPH J. LENERT.
BY W. D. O'Connor
ATTORNEY.

FIG. 4.

INVENTORS:
WILLIAM K. ANDREW
& JOSEPH J. LENERT.
BY: W. D. O'Connor
ATTORNEY.

Sept. 24, 1946.　　W. K. ANDREW ET AL　　2,407,970
WORK INDEXING MECHANISM
Filed April 13, 1942　　7 Sheets-Sheet 7

INVENTORS:
WILLIAM K. ANDREW
& JOSEPH J. LENERT.
BY: W. D. O'Connor
ATTORNEY.

Patented Sept. 24, 1946

2,407,970

UNITED STATES PATENT OFFICE 2,407,970

WORK INDEXING MECHANISM

William K. Andrew, Wauwatosa, and Joseph J. Lenert, Milwaukee, Wis., assignors to Kearney & Trecker Corporation, West Allis, Wis., a corporation of Wisconsin Application April 13, 1942, Serial No. 438,708

11 Claims. (Cl. 90—21)

This invention relates generally to machine tools, and more particularly to an automatic milling machine that includes a rotatable cutter and a movable work support embodying means for effecting the automatic indexing of a workpiece in timed relationship with the cyclic operation of the machine.

In order to increase the efficiency of an automatic milling machine through taking full advantage of the teachings of the present invention, the machine is provided with a pair of work supporting spindles mounted in spaced relationship on the movable work support and arranged in a manner to position separate workpieces on diametrically opposite sides of a rotatable cutter so that a cutting operation is performed on one workpiece while the other workpiece is being automatically indexed with the result that work is accomplished on each stroke of the operating cycle of the machine.

The primary object of the present invention is to provide a machine tool having a movable work support including new and improved work indexing means arranged to be actuated from a source of power separate from the machine transmission and under control of the movable work support so that the automatic operation of the work indexing means will result in the retention of one workpiece in indexed position for contact with the cutter while the other workpiece is being indexed preparatory to being brought into contact with the cutter on the next succeeding operating stroke of the machine.

Another object is to provide new and improved control means operative under the influence of relative movement between a stationary and a movable member of the machine tool, for controlling the application of power to effect the automatic indexing operation performed upon the workpiece in accordance with the established cycle of operation of the machine.

A further object is to provide new and improved hydraulic control and actuating means for effecting the coordinated operation of the indexing mechanism of each of the work holding elements in a manner that results in the indexing of one workpiece at a position remote from the cutter while the other workpiece is effectively locked against movement at a position in the proximity of the cutter.

According to this invention a milling machine of standard type having a vertically disposed cutter spindle and a work support arranged for reciprocating movement toward and from the axis of the cutter spindle is provided with a new and improved work holding element adapted to move with the work support to periodically bring the workpiece into contact with the rotating cutter and to index the workpiece on each successive cycle of machine operation to produce a series of uniformly spaced cuts in the face of the workpiece to form a gear or the like. Suitable work clamping and locking or latching mechanisms are provided to releasably retain the workpiece in indexed position and they operate under the influence of movement of the index operating mechanism to control the sequence of operations in a manner to effect the automatic release of clamping pressure on the work holding spindle, the release of the locking mechanism, the indexing movement of the workpiece, the reengagement of the lock, and the application of clamping pressure on the work holding spindle in response to the operation of a control element that is actuated by relative movement between the movable work support and stationary portion of the machine.

The foregoing and other objects of the invention, which will become more fully apparent from the following detailed specification, may be achieved by means of the particular milling machine constituting an exemplifying embodiment of the invention that is depicted in and described in connection with the accompanying drawings, in which.

Figure 1:
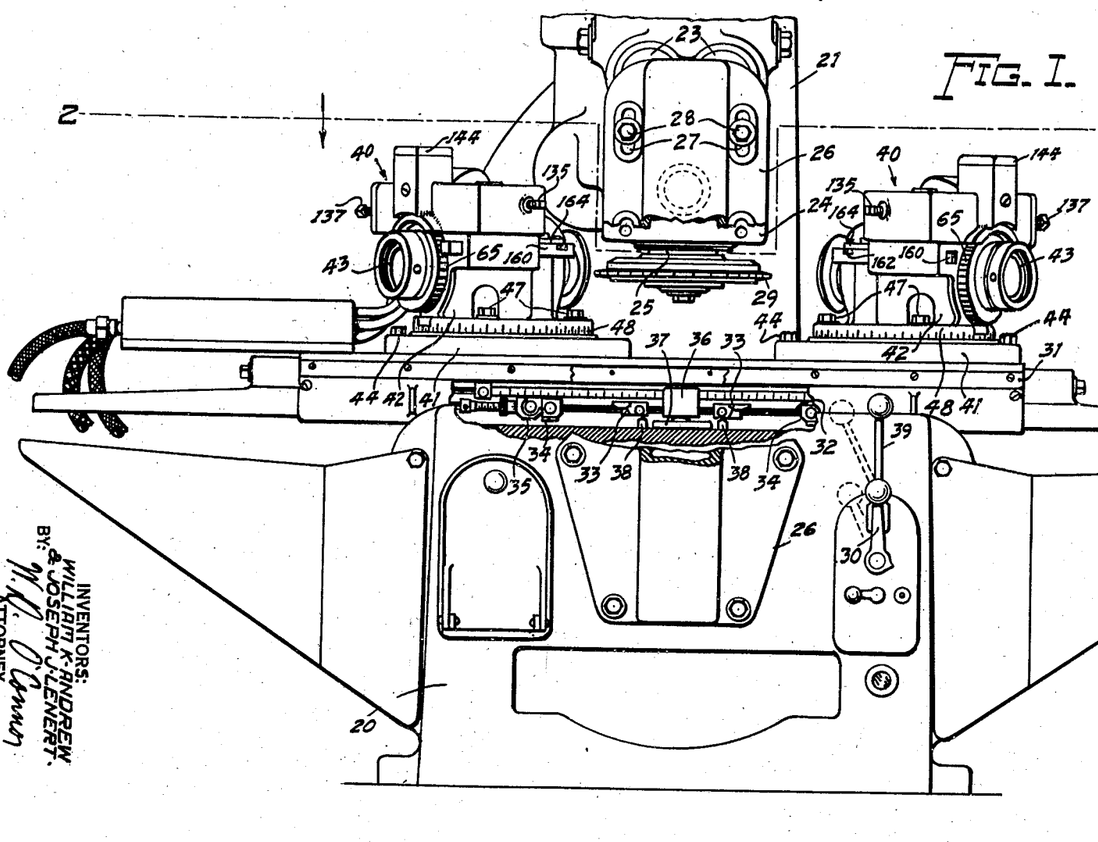
Figure 1 is a view in front elevation of a milling machine provided with work holding elements capable of automatic operation to index, lock and clamp workpieces in accordance with the teachings of the present invention.
Figure 2:
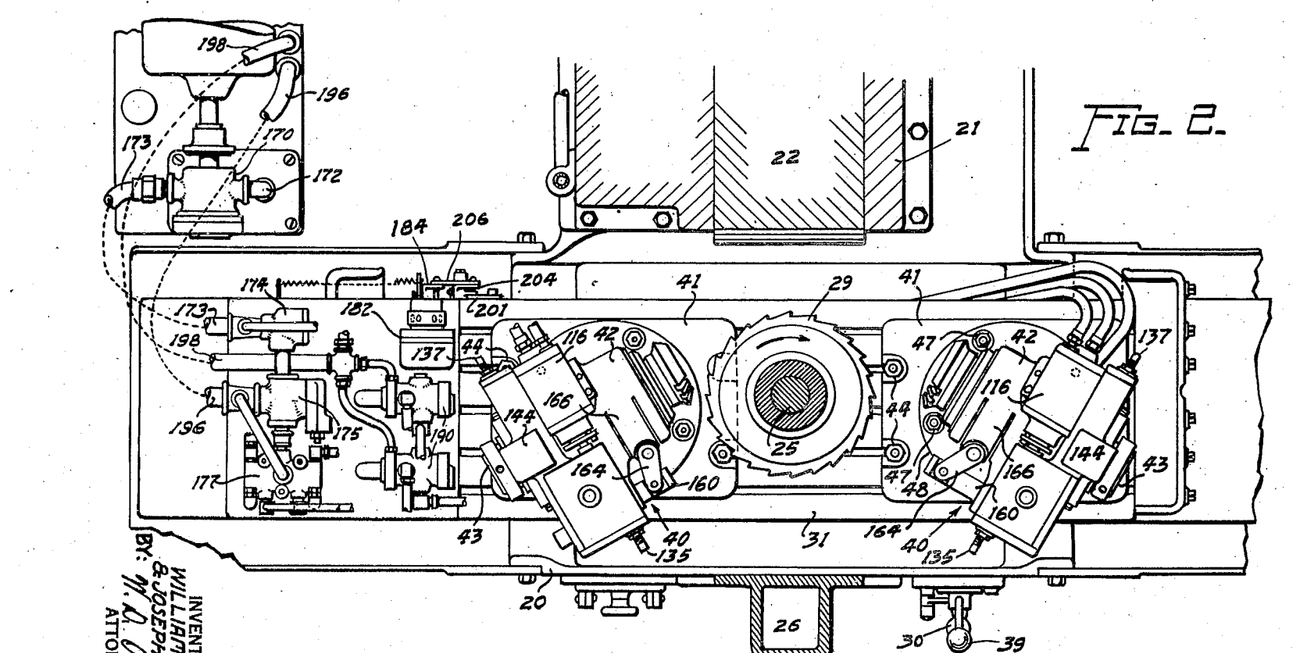
Fig. 2 is a view in horizontal section taken substantially along the plane of the line 2—2 of Fig. 1, and showing the relative positioning of the cutting tool and work holding elements that operate automatically to index, lock and clamp the workpiece in response to cyclic movement of the workpiece with respect to the rotating cutter.
Figure 3:
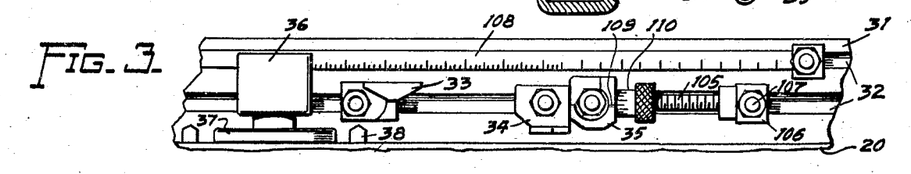
Fig. 3 is a fragmentary elevational view of the front face of the movable work supporting element and shows a set of trip dogs and cooperating elements that are operative to control the direction and rate of movement of the work supporting element.

Referring more specifically to the drawings, Figs. 1 and 2 thereof show the general structure of the automatic milling machine constructed in accordance with the teachings of the present invention that is referred to herein by way of example. As there shown, the machine comprises essentially a bed or base 20, constituting the machine frame and having secured at its rear portion an upstanding column 21 arranged to provide suitable guide means for a spindle block 22 from which the usual overarms 23 extend. An attachment 24, including a vertical spindle 25, is supported by the overarms 23 and a suitable harness or bracket 26 secured to the bed 20. The harness 26 is provided with slots 27 adapted to receive cap screws 28 that serve to provide a rigid anchoring means for the forward ends of the overarms 23 to maintain the attachment 24 securely in desired position of adjustment. The spindle 25 carries a cutter 29 that is driven in the usual manner by a transmission (not shown) and under the control of a hand lever 30 positioned on the front of the machine within convenient reach of the operator. A work support or table 31 is guided for reciprocating movement toward and from the axis of the cutter 29 in the usual manner on guide ways (not shown) formed on the bed 20. The front face of the table 31 is provided with T-slots 32 adapted to slidably receive a plurality of sets of individual trip dogs 33, 34 and 35 that may be secured in desired position of relative adjustment. The trip dogs that are shown in Fig. 1 and the set shown more clearly in Fig. 3 operate control members 36, 37 and 38 respectively to effect automatic changes in rate, stop, and reversal of table travel in accordance with the adjustment of the trip dogs and the position of the table with respect to the cutter. The manual control of the direction and rate of table travel movement may be effected by manipulating a hand lever 39 positioned adjacent to the spindle control lever 30 and operable to control the table transmission (not shown) in a well known manner.

For the purpose of increasing the production efficiency of the machine so that a cutting operation is performed on each forward and return stroke of the table, two work holding fixtures 40, that are identical save for opposite hand arrangement, may be secured to the table 31 in spaced relationship in a manner to alternately direct separate workpieces into the path of the rotating cutter 29 at diametrically opposite sides thereof. Each fixture includes a base 41, a body portion 42 and a hollow work spindle 43. The base 41 is adapted to be fixedly mounted on the table 31 by means of T-bolts 44 that are anchored in the usual T-slots formed in the upper surface of the table. The body portion 42 of the fixture 40 is arranged for adjustable rotatable positioning about a vertical axis upon the base 41. A centrally disposed circular recess 45 (see Fig. 4) formed in the base 41 serves as a journal to receive a trunnion 46 formed on the body portion 42 to locate and guide its movement on the base 41. The body portion 42 is secured in adjusted angular position on the base 41 by tightening nuts on T-bolts 47 that pass through a flange 48 and ride in an annular T-slot 49 formed in the base 41 and arranged concentrically with the recess 45. The hollow spindle 43 of the work holding fixture 40 is journalled for rotatable movement about a horizontal axis in a pair of tapered sleeve bushings 52 that are positioned in a horizontally disposed bore 53 formed in the body portion 42. The spindle 43 includes a head 54, a tapered bearing portion 55, a splined shank 56 and a threaded end 57. The spindle 43 is receivable through the bore 53 to a position in which the head 54 lies in the forward end of the bore 53 and the tapered bearing portion 55 in the forward tapered sleeve bushing 52. A sleeve element 61 provided with a splined central bore 62 is slidably receivable on the splined shank 56 of the spindle 43. The sleeve 61 includes a tapered bearing surface 63 for cooperation with the other tapered bushing 52 to support the rearward end of the spindle 43. For the purpose of eliminating axial movement of the spindle in the tapered bushings 52, an adjusting nut 64 is receivable on the threaded end 57 of the spindle 43. As the nut 64 is tightened, it engages the end of the sleeve 61 and effects the drawing in of the spindle 43 to eliminate end play between the spindle and the spindle supporting bearings.

To provide a means for effecting indexing movement of the spindle, a template 65 of suitable form and size is receivable on a tapered hub portion 66 of the sleeve element 61 of the spindle 43. The indexing template 65 may be releasably retained on the hub 66 by the application of cap screws 67 that pass through the template and are threaded into suitable holes formed in a locating and backing flange 68 of the sleeve 61.

Figure 4:
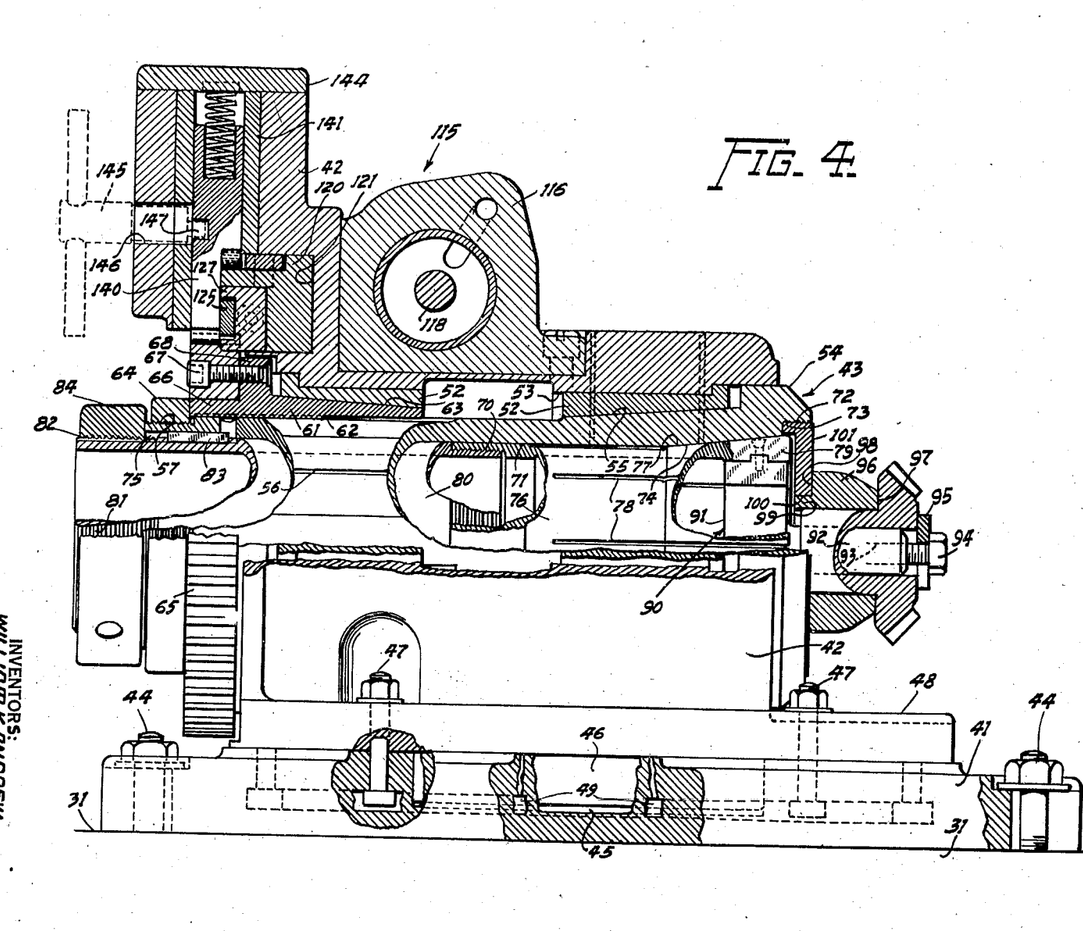
Fig. 4 is a view of the work holding element partly in side elevation and partly in axial section showing the work holding, indexing and latching elements.

The hollow indexable spindle 43 is arranged to receive a collet 70. As shown in Fig. 4, the spindle 43 contains an axial bore 71 having an internally threaded mouth 72 at its forward end, a shoulder 73, a tapered bearing surface 74 and a keyway 75 extending inwardly from the threaded end 57 of the spindle. The collet 70 comprises a sleeve element constructed in two pieces, a headpiece 76 having an outwardly flared end with a taper 77 matching that of the bearing surface 74 of the spindle bore 71 and provided with a plurality of axially arranged radially disposed slots 78 to divide the forward end of the collet 70 into a plurality of jaws 79 and a tailpiece 80 threadedly receivable in the headpiece 76 and including an externally threaded rear end portion 81 having a keyway 82 that is arranged to match the keyway 75 formed in the spindle bore 71. A key 83 serves to retain the collet 70 and spindle 43 in fixed angular relationship. The axial positioning of the collet 70 within the spindle 43 is adjustably controlled by a nut 84 that is receivable on the threaded end 81 of the tailpiece 80 of the collet and engages the end 57 of the spindle to cause the collet 70 to be drawn inwardly to effect the closing of the jaws 79 to releasably retain an adapter or work holder 90 in fixed position in the collet.

The adapter or work holder 90 comprises a cylindrical body portion 91 arranged to be gripped between the jaws 79 and includes an extended cylindrical portion 92 adapted to receive a workpiece and provided with an axially arranged bore 93 with threading for the receipt of a cap screw 94 that may be manipulated to apply a clamping pressure upon a C-washer 95 applied to the cap screw 94 between its head and the workpiece.

For the purpose of maintaining uniformity of positioning of the succession of workpieces applied to the adapter 90, a locating means is provided in the form of a spacer element 96 having a definite measurement between a work contacting face 97 and a shoulder 98 formed adjacent a hub 99 that is receivable in a bore 100 of a plug 101 adapted to be threaded into the mouth 72 of the spindle bore 71 until it seats on the shoulder 73.

For the purpose of regulating the extent of rapid traverse movement, feed movement, and accurately setting the point of reversal of the table travel, the several tripping dogs 33, 34 and 35 should be secured in proper positions in the lower T-slot 32 of the table 31. Since the operation illustrated in the drawings, that of gear gashing, requires both uniformity and accuracy of successive cuts, precision means is provided for setting the reversing dog 35 so that the extent of the table travel in either direction will remain constant and the depth of each tooth will be identical. The means chosen for this adjustment in the present instance, comprises an adjusting screw 105 having one end thereof threaded in an anchor block 106 that is adapted to be secured in desired position of adjustment with respect to the reversing dog 35 in the lower T-slot 32 by the tightening of an anchoring bolt 107. The primary or rough positioning of the reversing dog 35 may be made by positioning the rearward edge of the dog with regard to a scale 108 secured in a position of adjustment in the upper T-slot 32 by the application of suitable anchoring bolts. With the reversing dog 35 anchored in approximately the proper position, preferably short of the position required to give the correct depth to the cut, a test cut may be made and the depth of tooth measured to indicate the additional amount of movement required to set the depth of cut accurately. With the adjusting screw 105 moved into contact with the reversing dog 35 and a reading taken between a reference line 109 on the dog and a calibrated scale 110 on the head of the screw 105, the screw may be retracted the desired amount and the reversing dog may be moved into abutting relationship with the head of the screw where another accurate reading may be made on the scale 110. By means of the adjusting screw, the reversing dog may be accurately positioned and then anchored to insure table reversal at the exact position required to give the desired depth of cut in the workpiece.

In operating the machine, after a workpiece has been applied to each of the adapter elements 90, and the several dogs 33, 34 and 35 have been properly positioned in the lower table T-slot 32, the operator may throw the lever 30 to the position shown in dotted lines in Fig. 1 to engage the spindle transmission to rotate the cutter and he may initiate movement of the table 31 in selected direction by shifting the lever 39 either to the right or left to engage the table transmission. With the cutter rotating and the table in motion, one or the other of the workpieces will be brought toward the cutter. As the workpiece approaches the cutter 29, the trip dog 33 will engage the control member 36 and actuate it in well known manner to engage the table transmission at feed rate of movement so that the workpiece will be fed into the path of the rotating cutter at the proper rate of movement. As the cutter 29 reaches the proper depth of cut in the workpiece, one of the reversing dogs 35 which has been previously secured in precise position of adjustment actuates the control member 36 to effect reversal in the direction of table travel and cause the other workpiece to move toward the cutter at a rapid traverse rate of movement. As the second workpiece approaches the cutter, the speed of the table travel is reduced to feed rate by the action of the other trip dog 33 on the control member 36 and the cutter 29 engages the workpiece to effect the cutting operation to the depth controlled by the adjustment of the other reversing dog 35. The stop dogs 34 are provided merely as a safety device and operate, in the absence or failure of the reversing dogs 35, to disengage the table transmission to insure against damage to either the workpiece or the machine.

The duplex arrangement of the machine, resulting from the provision of two work spindles arranged on opposite sides of the cutter, provides a means for effecting a cutting operation on each stroke of the table so that two workpieces are acted upon on each cycle of machine operation. The completion of the gear cutting operation in an automatic machine of the type here shown requires that each workpiece be accurately indexed at one phase of the cycle and retained securely in indexed position during another phase of the cycle to permit the cutting operation to be accomplished with the degree of accuracy required.

In order to effect proper indexing of the workpieces, separate but identical hydraulically actuated indexing mechanisms are provided for the work spindle 43 of each fixture 40. Each work spindle indexing mechanism is actuated by a hydraulic motor 115 and includes a spindle clamping mechanism and a spindle latching mechanism. The operation of the work spindle clamping and latching mechanisms is coordinated with the operation of the indexing mechanism in a manner to insure the release of the clamping and latching action prior to the indexing operation and the reestablishment of the clamping and latching operation upon the completion of the indexing operation.

Figures 6, 7:
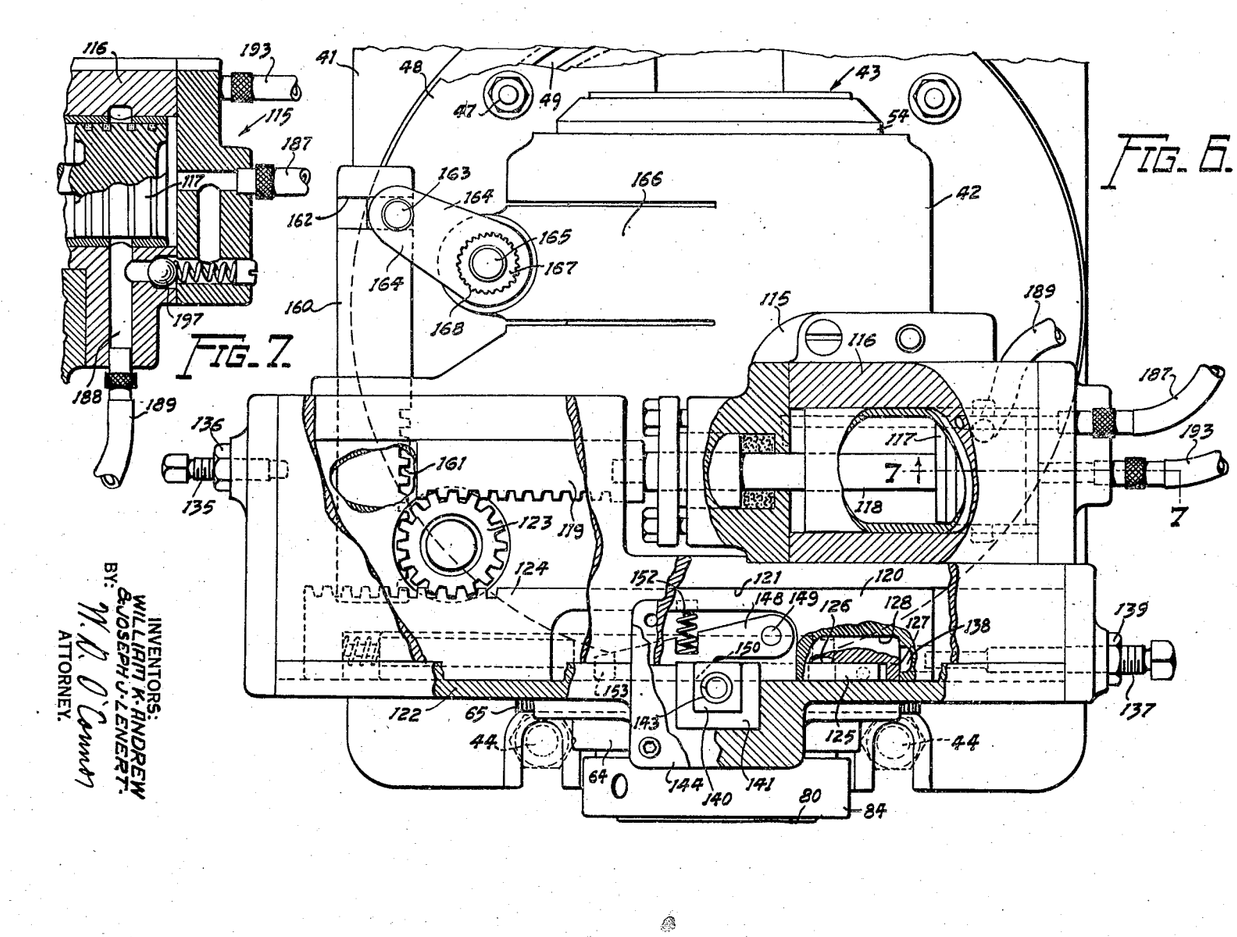
Fig. 6 is a fragmentary top plan view of the movable work supporting element including the work indexing, clamping and latching elements with parts broken away to more clearly disclose structural features of the elements.
Fig. 7 is a view in vertical section taken substantially along the plane of the line 7—7 of Fig. 6 and showing a check valve arranged in the indexing cylinder of the hydraulic operating and control system.

As shown in Fig. 6, each hydraulic motor 115 comprises a cylinder 116, mounted on the body portion 42 of each fixture 40, and a piston 117 having a piston rod 118 guided for reciprocating movement in the body portion of the fixture and provided with a rack portion 119.

Figure 5:
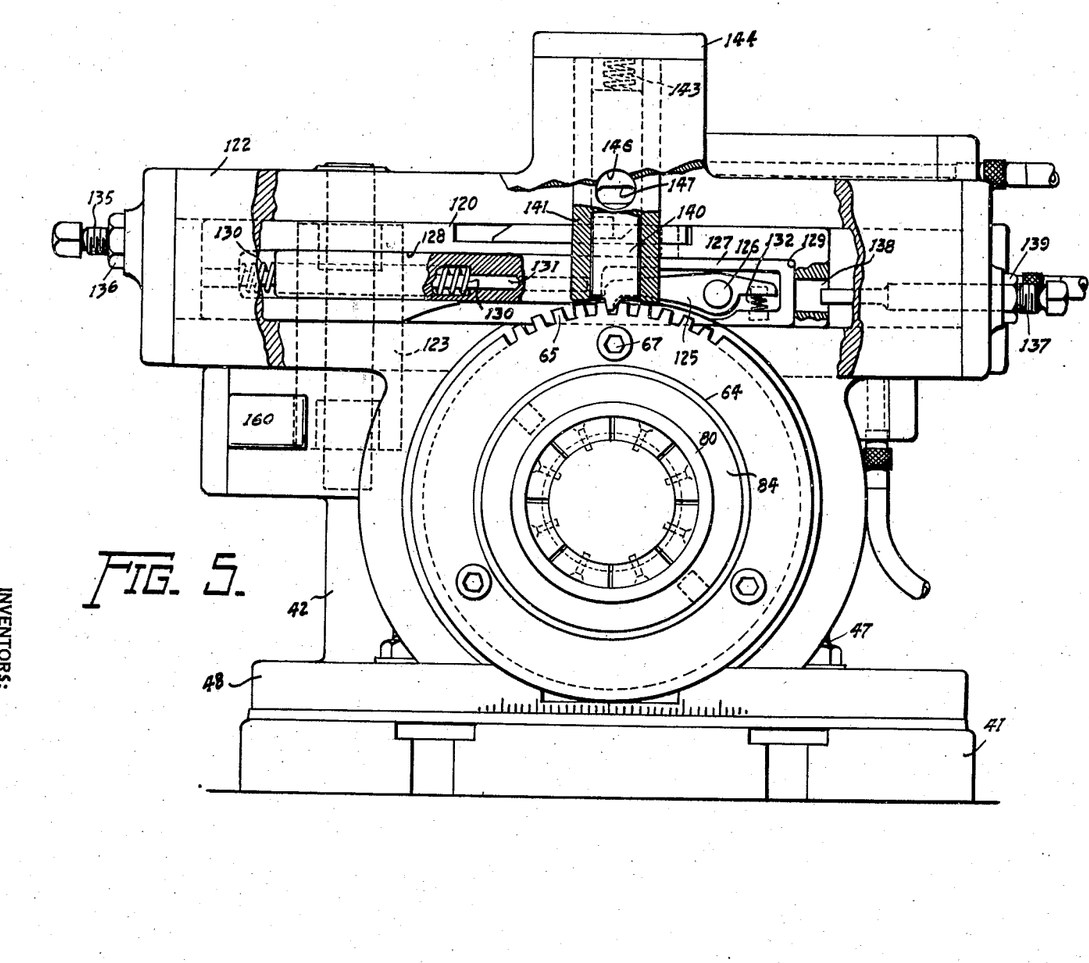
Fig. 5 is a view in rear elevation of the work holding element including the indexing and latching elements with parts broken away to disclose structural details.
Figures 8, 9, 10:
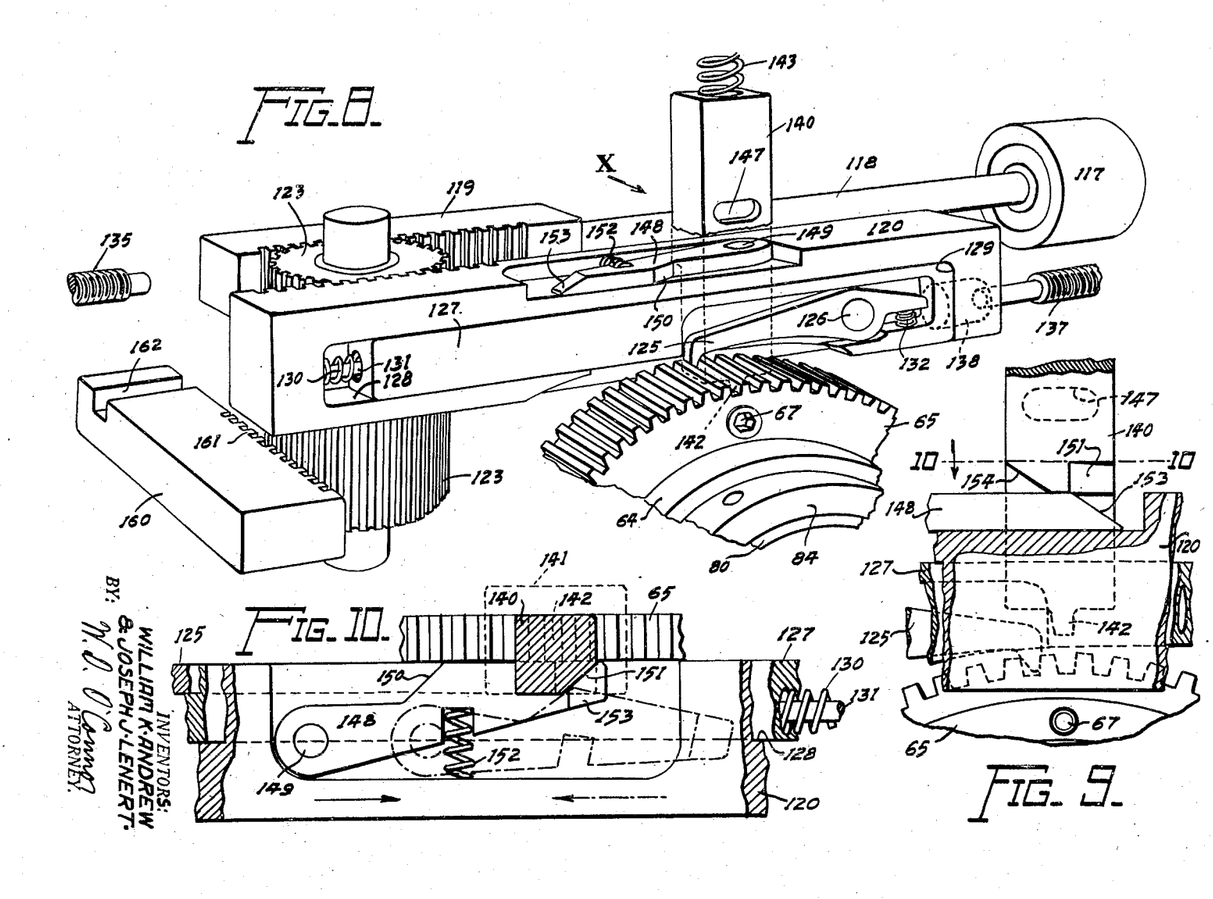
Fig. 8 is a view in perspective of the actuating mechanism for effecting the operation of the spindle clamping, work indexing, and the latching mechanisms.
Fig. 9 is a fragmentary view in elevation of a portion of the work indexing and latching mechanism.
Fig. 10 is a view in horizontal section taken substantially along the plane of the line 10—10 of Fig. 9 and showing the latch releasing pawl in elevation, the dot-dash showing of the pawl indicating its lateral pivotal displacement during the idle return stroke of the indexing mechanism.

Each spindle indexing mechanism comprises an indexing bar 120 guided for reciprocating movement in a channel 121 and retained therein by the application of a cover plate 122. Reciprocating motion is imparted to the indexing bar 120 by means of a wide faced pinion 123 that is journalled in the body portion 42 in meshing engagement with the rack portion 119 of the piston rod 118 and in mesh with a rack portion 124 formed on the indexing bar 120. Movement of the indexing bar 120 is transmitted to an indexing pawl 125 that is rockably mounted on a pin 126 anchored in a block 127 that is guided for axial sliding movement in a channel 128 formed in the indexing bar 120, as best shown in Figs. 5 and 8. The block 127 is normally retained in an extreme position in contact with an end wall 129 of the channel 128 by the action of a coil spring 130 surrounding a guide rod 131, that serves to retain the block 127 in the indexing bar 120, and disposed between one end of the channel 128 and the block 127. The pawl 125 is normally urged into contact with a tooth of the indexing template 65 by means of a coil spring 132 disposed between the block 127 and the free end of the pawl 125. The amount of indexing movement imparted to the work spindle 43 is dependent upon the adjustment of the stroke of the piston 117 and the block 127.

The adjustment of the stroke of the piston 117 may be effected by manipulating a set screw 135 to a position wherein it abuts the end of the piston rod 118 in its extreme forward position. The desired position of adjustment may be retained by tightening a jam nut 136 to lock the set screw 135 and thus limit the forward stroke of the piston 117 and hence the amount of movement imparted to the indexing bar 120 through partial rotation of the pinion 123. The stroke of the pawl 125 may be further limited by cutting down the extent of movement of the block 127. This may be accomplished by the manipulation of a set screw 137, the free end of which is arranged to pass through a hole 138 formed in the end wall of the indexing bar 120, to a position in which it abuts the end of the block 127 to limit the travel of the block 127 and the pawl 125 in desired extreme position. When the proper adjustment has been made, a jam nut 139 may be tightened to lock the set screw 137. The adjustment of the extent of movement of the piston 117 and the pawl 125 provides a simple and effective means for adjusting the extent of indexing movement imparted to the work spindle 43 through the action of the pawl 125 on the template 65.

The latching or locking mechanism, that functions to releasably retain the work spindle 43 in indexed position, is also under the control of the indexing mechanism. The latching or locking mechanism comprises a plunger 140 guided for vertical movement in a bearing 141 positioned in the body portion 42 of the fixture in a manner to overlie a portion of the template 65 and the indexing bar 120. The plunger 140 is provided with a tooth 142 on its lower end adapted to engage any of a series of indexing teeth or notches, formed on the template 65, under the action of a coil spring 143 that reacts against the top of the plunger 140 and a cover plate 144 that is applied to the body portion 42 of the fixture. The plunger 140 may be manually raised to disengage the tooth 142 from locking engagement with the template by the manipulation of a key 145 that may be inserted through a hole 146 and into a key slot 147 formed in the plunger 140, as shown in Fig. 4. Under normal circumstances, however, the release of the locking engagement of the tooth 142 with the template is performed automatically under the action of a pawl 148 that is pivotally mounted on a pin 149 secured in the indexing bar 120, as shown in Figs. 6, 8 and 10. On the forward, or inactive, stroke of the indexing bar 120, a cam surface 150 formed on the pawl 148 contacts a cam surface 151 formed on the plunger 140 and the contact between these two surfaces results in the lateral displacement of the pawl against the action of a coil spring 152. Upon completion of the forward stroke of the indexing bar 120, the coil spring urges the pawl to its forward position and as the return, or active indexing stroke is begun, a cam surface 153 formed on the pawl engages a cam surface 154 formed on the plunger 140, Fig. 9, and causes the plunger to rise thus raising the tooth 142 from locking engagement with the template 65. The plunger 140 is retained in elevated position by contact with the pawl 148 throughout the indexing stroke of the bar 120 during which the indexing pawl 125 has engaged the next succeeding tooth on the template to effect the indexing movement to the work spindle 43. When the indexing movement is completed the pawl passes out of contact with the plunger 140 and the coil spring urges the plunger downwardly to engage the tooth 142 with the tooth on the template 65 to lock the same in indexed position.

The spindle clamping mechanism, that functions to exert a clamping pressure on the work spindle 43 to insure the rigid holding of the workpiece during the cutting operation, is also actuated under the control of the indexing mechanism. The clamping mechanism comprises a clamping bar 160 guided for reciprocating movement in the body portion 42 of the fixture 40. As shown in Figs. 6 and 8, the clamping bar 160 is provided with a rack portion 161 that meshes with the lower portion of the wide faced pinion 123 in a manner to effect its axial displacement upon rotative movement of the pinion 123. The outer or free end of the clamping bar 160 is provided with a transversely disposed slot 162 adapted to receive a pin 163 carried by an arm 164 that is movable to effect the clamping action on the work spindle 43. The clamping action is obtained through a stud 165 that is anchored in the body portion 42 of the fixture and extends through an ear 166 that is an integral part of the body but that has an end and two sides cut free from the remainder of the body of the fixture. A nut 167 threaded onto the stud 165 is provided with a serrated peripheral surface adapted to receive a serrated hole 168 formed in the arm 164. The serrations on the nut and arm provide a simple and effective means for adjusting the nut 167 on the stud 165 in a manner such that the movement of the clamping bar 160, under the action of the pinion 123, is sufficient to apply adequate clamping pressure upon the forward spindle bearing to effectively retain the work spindle 43 against any movement during the cutting operation. Upon retracting movement of the clamping bar, the pressure is relieved and the spindle is free to be indexed under the action of the pawl 125 in the manner previously described.

Figures 11, 12:
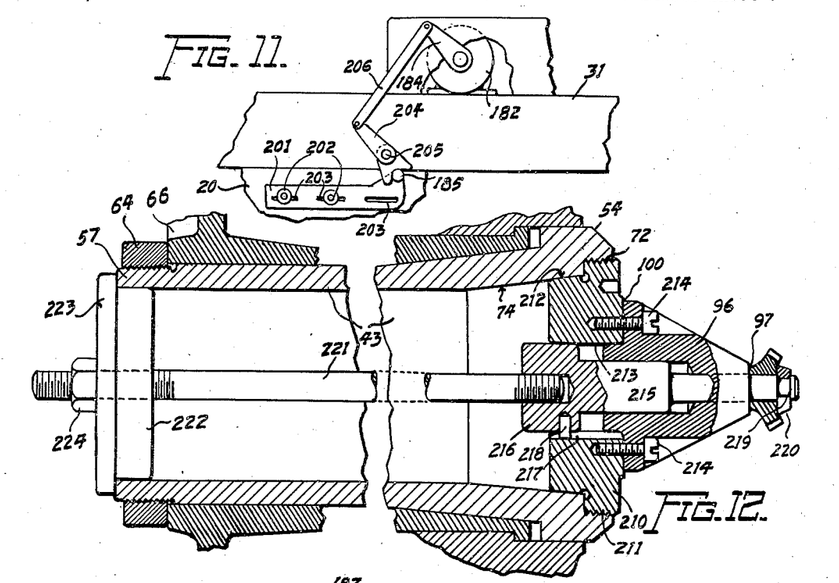
Fig. 11 is a view in side elevation of the control mechanism arranged on the rear face of the table and operative at a predetermined point of table travel to effect the automatic operation of the clamping, indexing and latching mechanisms.
Fig. 12 is a view in vertical axial section through the work holding spindle and showing a modified form of means for releasably retaining a workpiece in the indexable spindle.
Figure 13:
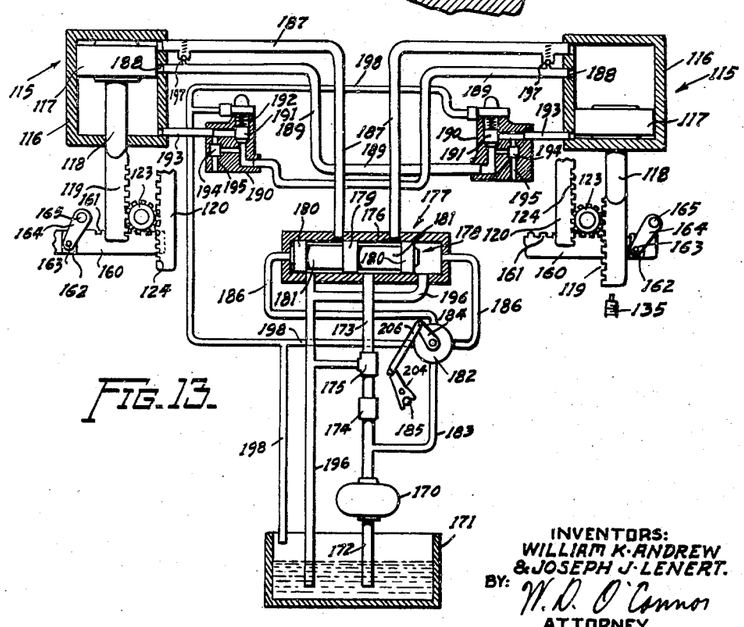
Fig. 13 is a schematic diagram of the hydraulic control and operating circuits of the machine and including portions of the clamping, indexing and latching mechanisms.

The hydraulic system shown schematically in Fig. 13 of the accompanying drawings illustrates a circuit including valve means adapted to be controlled in a manner to energize the motors 115 to effect movement of the indexing and associated clamping and latching mechanisms to produce a sequence of operations in accordance with the requirements of the work at hand. The hydraulic circuit includes a motor driven pump 170 adapted to receive a supply of fluid from a sump 171 through a conduit 172. A motor supply conduit 173 is provided with a check valve 174 operative to prevent back pressure in the circuit and a pressure relief valve 175 operative to establish the desired working pressure in the circuit. The supply conduit 173 delivers fluid under pressure from the pump 170 to the central portion of a cylinder 176 formed in a valve 177 that includes a movable plunger 178 provided with a central land 179 and a pair of end lands 180 spaced from the central land 179 by grooves 181. The plunger 178 of the valve 177 is maintained in one or the other extreme position under the influence of pressure fluid delivered from a pilot valve 182. A conduit 183 that branches from the main pressure line 173 leads fluid under pressure to the pilot valve 182, the valve stem of which is actuated by an arm 184 under the control of an operating pin 185 mounted on the machine bed 20 as shown in Fig. 11. The pilot valve 182 serves to direct the fluid under pressure to one or the other end of the cylinder 176 through the selected one of two conduits 186 to force the plunger 178 toward the far end of the cylinder. With the plunger 178 in the position shown, fluid under pressure is directed to the top of the cylinder 116 of the right hand motor 115 through a conduit 187 to force the piston 117 downwardly, as shown in Fig. 13, to effect the clamping of its associated work spindle in a manner previously described to rigidly secure the same in proper indexed position. When the clamping pressure in the right hand cylinder 116 has been built up to the required value, fluid under pressure will pass from a port 188, that is uncovered during the movement of the piston 117, through a conduit 189 to a sequence valve 190 where it acts upon a valve plunger 191 to urge it to open position against the action of pressure regulating spring 192. With the valve 190 in open position the fluid under pressure is delivered through a conduit 193 to the lower end of the cylinder 116 of the left hand motor 115 to cause the piston 117 to move upwardly to effect the indexing movement of the work spindle in a manner previously described.

When the cutting operation has been completed on the clamped workpiece and the table reversal has been effected by one of the trip dogs 35, the movement of the table will effect the tripping of the pilot valve 182 through the operation of the pin 185 on the valve actuating arm 184 to effect reversal of the position of the plunger 178 to cut off the supply of fluid under pressure to the top of the right hand cylinder and direct it through the other conduit 187 to the top of the left hand cylinder. As the piston 117 of the left hand cylinder moves downwardly to effect the clamping action on the associated work spindle, the fluid contained in the lower portion of the cylinder will flow back to the sump 171 through the conduit 193 into the sequence valve 190 and through a by-pass valve 194, that is normally maintained in closed position by the pressure of a light coil spring 195, to the conduit 189 into the right hand cylinder through port 188 and thence through the conduit 187 to the cylinder 176 in the valve 177 from which it passes to a conduit 196, by reason of the fact that the plunger 178 of the valve 177 has been moved to its other extreme position, and thence to the sump 171. In order to permit full travel of each piston 117 to complete the clamping and indexing operations, a check valve 197 is built into each cylinder 116 as shown in detail in Fig. 7 and arranged to permit the free flow of fluid under pressure from the conduit 189 to the conduit 187 when the travel of the piston 117 has effected the closing of the port 188. In order to carry away exhaust fluid from the sequence valves 190 and control valve 177, a conduit 198 leads from each of the valves 190 and 177 to the sump 171. The conduit 193 from each of the sequence valves 190 provides assurance that any leakage of fluid past the valve plunger 191 will be discharged into the sump 171 at atmospheric pressure to prevent a building up of pressure behind the plunger 191 in excess of the value of that exerted by the spring 192. The conduit 198 directed from the pilot valve 182 to the sump 171 provides a passage for fluid selectively from either end of the cylinder 176 to permit the plunger 178 to travel freely from one extreme position to the other under the influence of pressure fluid from the pilot valve 182. It should be noted at this point that the motors 115 are arranged serially in the circuit in a manner such that the operation performed by one motor must be completed before the second motor is energized to perform its duty.

The control of the pilot valve 182 and the points in the cycle of table travel at which the valve 182 is shifted to reverse the flow of fluid to the cylinder 116 may be adjusted in accordance with the diameter of the cutter 29 so that the operation of the spindle clamping mechanism is effected in the proximity of the cutter but prior to actual contact between the cutter and workpiece. The tripping pin 185 that is operative to effect the shifting of the pilot valve 182 is carried by a bracket 201 adapted to be secured to the bed 20 of the machine, as shown in Fig. 11, in desired position of adjustment by cap screws 202 passing through slots 203 arranged to provide a means for permitting selected positioning of the bracket 201 with respect to the size of the cutter utilized on the particular type of workpiece on which the cutting operation is being performed. The pin 185 is adapted to contact one arm of a bifurcated fork 204 on each stroke of the table 31 to effect a rocking movement of the fork on a pivot pin 205 that positions it on the rear face of the table and carries it past the pin 185. A connecting link 206 pivotally mounted on the free end of the fork 204 and the valve actuating arm 184 serves to transmit the rocking movement of the fork 204 to the stem of the valve 182 to effect its reversal on each stroke of the table 31 to thereby effect the automatic operation of the work spindle indexing and associated clamping and locking mechanisms to produce the results previously described.

A modified form of adapter or work holder is shown in Fig. 12 of the accompanying drawings. While this form of work holder partakes of the general characteristics of the one previously described, it has particular advantages in the handling of certain types of workpieces. The modified form of work holder comprises a plug 210 having a threaded flange 211 that is receivable in the threaded mouth 72 in the head 54 of the hollow spindle 43 and a tapered bearing surface 212 adapted to contact the tapered bearing surface 74 of the spindle to insure its proper location. The plug 210 includes a central bore 213 adapted to receive the hub 99 of the work locating or spacer element 96 that has a definite measurement between the work contacting face 97 and the shoulder 100 that abuts the face of the plug 210. In the present instance, the spacer element 96 is removably secured to the plug by means of cap screws 214. A work supporting element or bar 215 includes an enlarged end portion 216 that is guided for axial movement in the bore 213 of the plug and retained against rotary movement by the coaction of a keyway 217 formed in the bore 213 and a pin 218 mounted in the portion 216. The forward portion of the bar 215 passes through the central bore in the spacer 96 and extends a sufficient distance beyond the surface 97 to permit the application of a workpiece over the forward end of the bar. A groove 219 formed adjacent the end of bar 215 serves to receive a workpiece retaining element in the form of a C-washer 220. A simple and convenient means is provided for effecting the ready application or release of clamping pressure upon the workpiece. A stud 221 anchored in the end portion 216 of the work supporting element 215 extends rearwardly through the hollow spindle 43 and passes through a central opening formed in a plug 222 that is receivable into the open end of the spindle and includes a flange 223 for pressure contact with the end 57 of the spindle 43. A nut 224 that is threadedly received on the stud 221 may be tightened against the outer surface of the plug 222 to effect a drawing in action on the work supporting element 215 to apply a clamping pressure on the workpiece through the action of the C-washer 220. After the cutting operations on the workpiece are completed, the nut 224 may be loosened and the C-washer 220 slid out of the groove 219 to permit the removal of the finished workpiece and the application of an uncut workpiece.

From the foregoing detailed description of the structure and operation of the illustrative embodiment of the present invention, it will be apparent that a new and improved work indexing mechanism has been provided that is especially adapted for efficient and convenient operation and that may be adjusted readily to accommodate a wide variety of workpieces.

Although the illustrative embodiment of the invention has been described in considerable detail for the purpose of making a full disclosure of a practical operative structure by means of which the invention may be practiced, it is to be understood that various novel features of the invention may be incorporated in other structural forms without departing from the spirit and scope of the invention as defined in the subjoined claims.

The principles of the invention having now been fully explained in connection with the foregoing description of the embodying apparatus, we hereby claim as our invention:

1. The combination with a machine tool including a rotatable cutter and a reciprocatable work support, of a pair of indexable work holding spindles arranged on said reciprocatable work support in a manner to effect alternate movement of each work spindle toward and from said cutter, an indexing and clamping mechanism operatively associated with each work spindle, a hydraulic motor for effecting the operation of each of said mechanisms, a power source for said motors, and control means operative to energize one of said motors to effect the indexing movement of its associated work spindle and energize the other of said motors to effect the clamping operation on its associated work spindle.

2. The combination with a machine tool including a rotatable cutter and a reciprocatable work support, of a pair of indexable work holding spindles arranged in spaced relationship on said reciprocatable work support at diametrically opposite sides of said cutter in a manner to effect alternate movement of each work spindle toward and from said cutter, an indexing and clamping mechanism operatively associated with each work spindle, a hydraulic motor for effecting the operation of each of said mechanisms, a power source for said motors, and control means operative on each stroke of said reciprocating work support to energize one of said motors to effect the indexing movement of its associated work spindle and energize the other of said motors to effect the clamping operation on its associated work spindle.

3. The combination with a machine tool including a rotatable cutter and a reciprocatable work support, of a pair of indexable work holding spindles arranged on said reciprocatable work support in a manner to effect alternate movement of each work spindle toward and from said cutter, an indexing and clamping mechanism operatively associated with each work spindle, a hydraulic motor for effecting the operation of each of said mechanisms, a power source for said motors, and control means responsive to movement of said reciprocating work support to energize one of said motors to effect the indexing movement of its associated work spindle at a position remote from said cutter and energize the other of said motors to effect the clamping operation on its associated work spindle at a position in the proximity of said cutter.

4. The combination with a machine tool including a rotatable cutter and a reciprocatable work support, of a pair of indexable work holding spindles arranged on said reciprocatable work support in a manner to effect alternate movement of each work spindle toward and from said cutter, an indexing and clamping mechanism operatively associated with each work spindle, a pair of serially connected hydraulic motors each operatively associated with one of said indexing and clamping mechanisms, a power source for said motors, and control means operative to energize one of said motors to effect the clamping operation on its associated work spindle prior to energizing the other of said motors to effect the indexing movement of its associated work spindle.

5. The combination with a machine tool including a rotatable cutter and a reciprocatable work support, of a pair of indexable work holding spindles arranged on said reciprocatable work support in a manner to effect alternate movement of each work spindle toward and from said cutter, an indexing and clamping mechanism operatively associated with each work spindle, a pair of serially connected hydraulic motors each operatively associated with one of said indexing and clamping mechanisms, a power source for said motors, and control means responsive to movement of said reciprocating work support to energize one of said motors to effect the clamping operation on its associated work spindle at a position in the proximity of said cutter prior to energizing the other of said motors to effect the indexing movement of its associated work spindle at a position remote from said cutter.

6. In a milling machine, a cutter supporting spindle, a work carrying table mounted for reciprocatory movement in cooperating relationship with said cutter supporting spindle, a pair of indexing fixtures mounted on said table at opposite sides of said spindle in positions to present work pieces to a cutter on said spindle, table driving and controlling mechanism arranged to effect reciprocatory movement of said table over a predetermined course of action adapted to feed work pieces on said fixtures into opposite sides of a cutter on said spindle alternately, means to effect indexing movement of each of said fixtures independently for presenting successive work piece elements to the cutter, means to clamp each of said fixtures for holding its work piece rigidly in position to be engaged by the cutter, control means responsive to movement of said table and operative to effect indexing of each fixture when at a position remote from said spindle and to effect clamping of each fixture when at a position adjacent to said spindle, and interlocking means associated with said control means and operative to prevent indexing movement of either fixture until after the other fixture has been clamped.

7. In a machine tool, the combination with a cutter supporting structure, of a work supporting table slidably mounted for reciprocating movement in cooperating relationship with said cutter supporting structure, a pair of indexing work carrying members mounted in spaced relationship on said table in manner to support work pieces for alternate engagement with a cutter on said cutter supporting structure, control means arranged to effect indexing and locking of said work carrying members, and interlocking means associated with said control means and arranged to provide for clamping one of said indexing members as a prerequisite to unclamping and indexing movement of the other indexing member.

8. In an automatic milling machine having a frame, a cutter carrying spindle rotatably mounted on said frame, a work supporting table slidably mounted on said frame in cooperating relationship with said cutter carrying spindle, a pair of indexing work holding fixtures carried by said table in position to cooperate alternately with said cutter carrying spindle, means operating automatically to effect reciprocating movement of said table through a predetermined distance, automatic control means arranged to lock each indexing fixture as it approaches said cutter carrying spindle, and automatic control means arranged to effect indexing movement of each fixture when it is at a position remote from said cutter carrying spindle.

9. In a machine tool, the combination with a cutter supporting structure, of a work supporting table slidably mounted for reciprocating movement in cooperating relationship with said cutter supporting structure, a pair of indexing work carrying members mounted in spaced relationship on said table in manner to support work pieces for alternate engagement with a cutter on said cutter supporting structure, control means actuated in response to movement of said table and arranged to effect indexing and locking of said work carrying members, and interlocking means associated with said control means and arranged to provide for clamping one of said indexing members as a prerequisite to unclamping and indexing movement of the other indexing member.

10. In an automatic milling machine having a frame, a cutter carrying spindle rotatably mounted on said frame, a work supporting table slidably mounted on said frame in cooperating relationship with said cutter carrying spindle, a pair of indexing work holding fixtures carried by said table in position to cooperate alternately with said cutter carrying spindle, means operating automatically to effect reciprocating movement of said table through a predetermined distance, and control means operating in response to movement of said table and arranged to lock each indexing fixture as it approaches said cutter carrying spindle and to effect indexing movement of each fixture when it is at a position remote from said spindle.

11. In an automatic machine tool, the combination with a frame, a cutter carrying spindle rotatably mounted in said frame, and a work carrying table movably mounted on said frame in cooperating relationship with said cutter carrying spindle, of a pair of work supporting indexing fixtures mounted on said table at opposite sides of said spindle, hydraulic actuating mechanism arranged to operate said indexing fixtures in manner to index and clamp work pieces in successive positions, work feeding mechanism operatively arranged to effect automatic reciprocating movement of said table, a hydraulically actuated valve arranged to control said indexing and clamping mechanism in manner to effect alternate indexing and clamping actions of said pair of indexing fixtures, and a pilot valve arranged to be actuated in response to movement of said table and operative to effect actuation of said control valve in manner to cause successive alternate indexing and clamping actions in coordinated relationship with feeding movements of said table.

WILLIAM K. ANDREW.
JOSEPH J. LENERT.